United States Patent
Pappu et al.

(10) Patent No.: US 12,461,878 B2
(45) Date of Patent: Nov. 4, 2025

(54) SYSTEM, METHOD, APPARATUS AND ARCHITECTURE FOR DYNAMICALLY CONFIGURING DEVICE FABRICS

(71) Applicant: Intel Corporation, Santa Clara, CA (US)

(72) Inventors: Lakshminarayana Pappu, Folsom, CA (US); David J. Harriman, Portland, OR (US); Ramadass Nagarajan, Portland, OR (US); Mahesh S. Natu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 802 days.

(21) Appl. No.: 17/558,945

(22) Filed: Dec. 22, 2021

(65) Prior Publication Data

US 2022/0114131 A1     Apr. 14, 2022

(51) Int. Cl.
   *G06F 13/42*     (2006.01)
(52) U.S. Cl.
   CPC .. *G06F 13/4221* (2013.01); *G06F 2213/0026* (2013.01)
(58) Field of Classification Search
   CPC ............ G06F 13/4221; G06F 2213/0026
   See application file for complete search history.

(56) References Cited

U.S. PATENT DOCUMENTS

| | | | |
|---|---|---|---|
| 11,231,927 B2 | 1/2022 | Adler | |
| 2003/0217217 A1* | 11/2003 | Harris | H04L 12/462 |
| | | | 710/306 |
| 2016/0283428 A1* | 9/2016 | Guddeti | G06F 13/4022 |
| 2017/0300445 A1* | 10/2017 | McKnight | G06F 13/4068 |
| 2018/0121574 A1 | 5/2018 | Srinivasan et al. | |
| 2018/0329855 A1* | 11/2018 | Das Sharma | H04L 69/24 |
| 2020/0344329 A1 | 10/2020 | Cannata et al. | |
| 2020/0394148 A1* | 12/2020 | Regan | G06F 13/20 |
| 2020/0394150 A1* | 12/2020 | Lanka | G06F 13/4226 |
| 2021/0294762 A1 | 9/2021 | Desai et al. | |
| 2022/0114131 A1 | 4/2022 | Pappu et al. | |

OTHER PUBLICATIONS

CXL Contractual Sig; "Compute Express Link Specification," Mar. 2019, Rev. 1, 206 pgs.
International Searching Authroity, International Search Report and Written Opinion dated Mar. 2, 2023 in International Application No. PCT/US2022/048643 (12 pages).

* cited by examiner

*Primary Examiner* — Nimesh G Patel
(74) *Attorney, Agent, or Firm* — Essential Patents Group, LLP; Christopher K. Gagne

(57) ABSTRACT

In one embodiment, a device includes: an interface circuit to couple the device to a host via a link, where in a first mode the interface circuit is to be configured as an integrated switch controller and in a second mode the interface circuit is to be configured as a link controller; and a fabric coupled to the interface circuit, the fabric to couple to a plurality of hardware circuits, where the fabric is to be dynamically configured for one of the first mode or the second mode based on link training of the link. Other embodiments are described and claimed.

20 Claims, 7 Drawing Sheets

SYSTEM, METHOD, APPARATUS AND ARCHITECTURE FOR DYNAMICALLY CONFIGURING DEVICE FABRICS

BACKGROUND

In computing systems, interconnects operate in accordance with selected interconnect protocols to couple devices together and enable communication. Some protocols support switch topologies and hot-add of devices into a computing platform. From a system perspective, an in-built solution is seamless for either a switch-based or a non-switch-based platform configuration. Statically hard wiring platforms and churning out different platforms and device configurations for switch-based and non-switch-based solutions is not a viable situation.

DETAILED DESCRIPTION

Figure 1A:
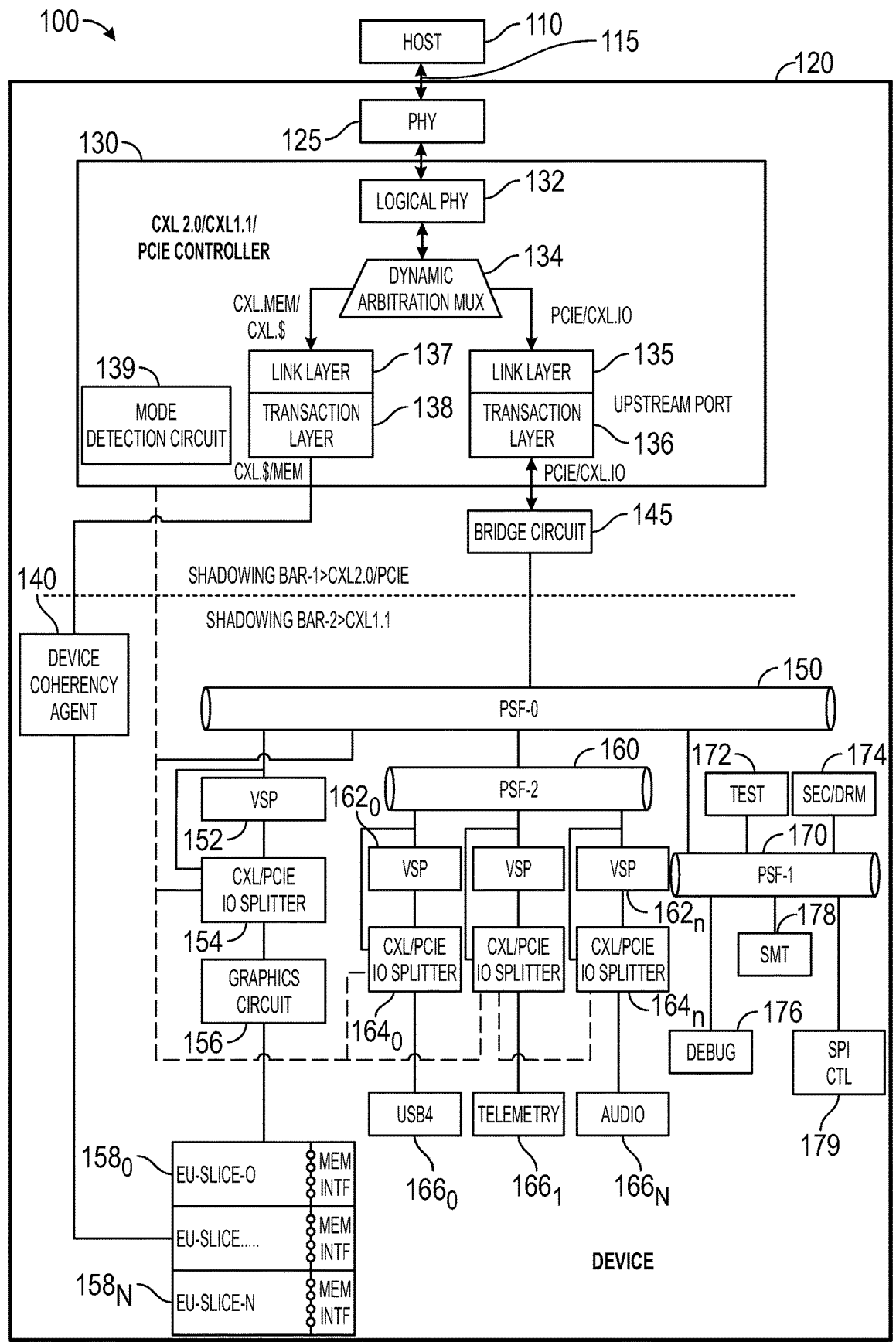
FIG. 1A is a block diagram of a system in accordance with an embodiment.

In various embodiments, a device such as an accelerator device to be configured into a platform may include a dynamically configurable fabric network. By way of this dynamically configurable fabric network, such device may be incorporated into multiple types of platform configurations, rather than limiting the device to a particular platform configuration.

Although embodiments are not limited in this regard, one example of different platform configurations or capabilities may be different serial interconnect protocols by which the device may couple to the platform. Particular protocols available using embodiments include a Peripheral Component Interconnect Express (PCIe) protocol such as in accordance with a given version of a PCIe specification such as the PCIe Base Specification version 5.0 (published 2019) or any future update, version or variation thereof. Other protocols may include a Compute Express Limited (CXL) protocol such as in accordance with a given version of a CXL specification such as the CXL Specification version 1.1 (published March 2020), 2.0 (published November 2020), any future update, version or variation thereof. Of course still other protocols are possible.

In embodiments, the device may dynamically determine whether it is coupled to a host by a link that operates according to a protocol that either supports or does not support integrated switch capabilities. As to the above examples, CXL 2.0 and PCIe support integrated switch topologies and hot-add, while CXL 1.1 does not. Accordingly, the device may dynamically determine, e.g., at link training, the link protocol by which it couples to the platform and dynamically configure itself automatically to operate correctly.

Accordingly, based on link training, the device can identify the link type and based thereon, dynamically configure one or more internal fabrics. In addition, interface circuitry of the device in the form of a link controller also may be configured to operate either with or without integrated switch functionality. As a result, devices coupled behind this interface circuitry, including endpoint devices such as intellectual property (IP) hardware circuits, also may be differently configured depending upon the detected mode.

That is, when integrated switch functionality is available, such endpoints can be configured as PCIe endpoints. Instead, when no integrated switch functionality is enabled such as for CXL 1.1 operation, these endpoints may be exposed as root complex integrated endpoints. Furthermore as will be described herein, additional switching circuitry such as virtual switch ports may be enabled or disabled depending upon whether integrated switch functionality is active. While described with these particular dynamic configuration capabilities for one or more fabrics, IP circuits and internal switch circuitry of a device, it is possible that additional device dynamic configuration may occur, such as by way of dynamically selecting device IDs to avoid conflicts between the different modes.

Thus with embodiments, a device may be provided that anticipates all possible platform configurations, and can expose all system capabilities for multiple protocols, in contrast to hardcoding the platform configuration either to support CXL2.0/PCIe or CXL1.1 based on what host a device will be attached to. During initial phases of a negotiation, link training occurs between host and device, and the link enters a L0 state. At this point, firmware (which may execute on the host) polls a device link-state machine and checks what state the link has been trained to, e.g., CXL1.1, PCIe or CXL2.0.

Based on this determination, firmware may configure the mode of operation, and fabric, interconnect structures and functional circuitry may behave in the corresponding mode, including appropriate dynamic configuration of fabrics for one of multiple modes and functional circuits to have different hardware configurations; one to support PCIe endpoints and another one to support a system of root complex integrated endpoints. With embodiments, during host BIOS enumeration, a system may work seamlessly since hardware is dynamically configured for the enumeration to take place. As such, a seamless device solution is realized to support backward compatibility for CXL2.0-built systems, especially for architectures with internal switch configurations. No additional platform configuration is required either for an original equipment manufacturer (OEM) or end customers, as one device solution supports any host/device configuration.

Referring now to FIG. 1A, shown is a block diagram of a system in accordance with an embodiment. More specifically in FIG. 1A, a system 100 may be any type of computing platform, ranging from a relatively small device such as a portable computer or other personal computer to larger devices such as servers and datacenter-based implementations. In any event, in the high level shown in FIG. 1A, system 100 includes a host 110. In embodiments, host 110 may be a system-on-chip (SoC) or other main host processor of a system. Host 110 may in one or more examples be a multi-core SoC or other processor having additional circuitry including a serial interface circuit to interface to one or more devices coupled to host 110 via one or more serial links.

In turn, via a serial link 115, host 110 couples to a device 120. In embodiments herein, device 120 may be some type of accelerator device. In different use cases, device 120 may be a graphics accelerator, a network accelerator, specialized compute accelerator or so forth. Furthermore, understand that device 120 may have different form factors in different implementations. In some cases, device 120 may be implemented as an add-in card, which may couple into a slot of a motherboard. In other cases, device 120 may be implemented as an integrated circuit to be directly adapted onto a motherboard or other circuit board of system 100.

Various details of device 120 are illustrated. As shown, device 120 couples via link 115, which may be a given serial link such as a PCIe or CXL link to host 110 via a physical (PHY) circuit 125. Although embodiments are not limited in this regard, PHY circuit 125 may be a PCIe 5.0-compatible component that may operate at speeds of, e.g., 2.5 gigatransfers (GT)/second. In turn, PHY circuit 125 couples to a link controller 130.

As designed and manufactured, link controller 130 may be capable of operation as a CXL 1.1/CXL 2.0/PCIe link controller. Accordingly, depending upon a particular system in which device 120 is placed, controller 130 may be dynamically configured to operate according to a given one of these protocols. In embodiments herein, more particularly link controller 130 may be dynamically configured to operate in one of two modes, namely a first mode, referred to herein as an integrated switch functionality mode, as may be used when implemented in a CXL 2.0 or PCIe-based system, and a second mode, namely a link controller mode, when configured in a CXL 1.1-based system.

As illustrated, controller 130 includes a logical PHY (logPHY) 132 which may operate in accordance with a given specification, such as an Intel® Logical PHY Interface (LPIF) specification, e.g., a given version of this specification, e.g., version 1.1 (published September 2020), or future versions or revisions to this specification. In turn, log PHY 132 couples to a dynamic arbitration multiplexer 134, which may selectively provide communications of different protocols to different combinations of link and transaction layers, namely link layer 137/transaction layer 138 and link layer 135/transaction layer 136. Thus as shown, PCIe/CXL.I/O communications may proceed via layers 135/136, while CXL.mem/CXL.cache communications may proceed via layers 137/138.

Link controller 130 further includes a mode detection circuit 139. In embodiments, detection circuit 139 may, based on link training, determine the type of active protocol and send a mode detection signal to various downstream components to enable their dynamic configuration. Link controller 130 further may include link training circuitry to effect link training with host 110.

Still with reference to FIG. 1A, PCIe/CXL.I/O communications may proceed through a bridge circuit 145 to a first configurable fabric 150 which may be implemented as a primary scalable fabric (PSF). Fabric 150 may be dynamically configured for operation in one of the two modes in response to the mode detection signal. In turn, CXL.cache/memory transactions may be communicated between layers 137/138 and a device coherency agent 140 that in turn couples to a plurality of execution units $158_{0\text{-}N}$.

In embodiments, each execution unit 158 may be a slice of a given accelerator, e.g., graphics processing circuitry, each of which include an internal memory interface. Slices 158 further couple to a graphics circuit 156, which may act as an interface between the individual execution units and additional circuitry. As shown, graphics circuit 156 in turn couples to a splitter 154, implemented as a CXL/PCIe I/O splitter. The splitter may, depending upon the type of traffic, direct communications appropriately. As shown, splitter 154 couples to a virtual switch port (VSP) 152. When operating in the first mode (an integrated switch topology), VSP 152 may be active.

Still with reference to FIG. 1A, fabric 150 further couples to another fabric 160 which may be another dynamically configurable fabric implemented as another PSF. As shown, PSF 160 couples to a plurality of VSPs $162_{0\text{-}n}$ each of which in turn couples to another splitter $164_{0\text{-}n}$. In turn, each of these splitters may couple to a given IP hardware circuit, implemented as various types of endpoint components. In the embodiment shown, these endpoints may include a USB4 interface circuit $166_0$, a telemetry circuit $166_1$ and an audio circuit $166_n$. Depending upon the mode, each of these IP circuits may be dynamically configured to operate either as a PCIe endpoint (in the first mode) or as a root complex integrated endpoint (in the second mode). To this end, each IP circuit may include a control circuit that, in response to a mode detect signal, dynamically configures the IP circuit to be a PCIe endpoint or a root complex integrated endpoint. This control circuit also may expose different configuration spaces and/or registers of the IP circuit in the different modes.

As further shown, another fabric 170 may further couple to fabric 150. Various components couple to fabric 170. As shown, a test circuit 172, a security/digital rights management (DRM) circuit 174, a debug circuit 176, an SMBus message transport (SMT) circuit 178 and a Serial Peripheral Interface (SPI) controller 179 all may couple to fabric 170. DRM circuit 174 may perform digital rights management and security operations to ensure that security keys are appropriately generated and are communicated with the host. SMT circuit 178 may ensure the correctness of SEC/DRM block's functionality on silicon, by packetizing communication on the fabric and streaming the data outside the SoC to check against expected behavior. Understand while shown with these particular components and device configuration in FIG. 1A, many variations and alternatives are possible.

Figure 1B:
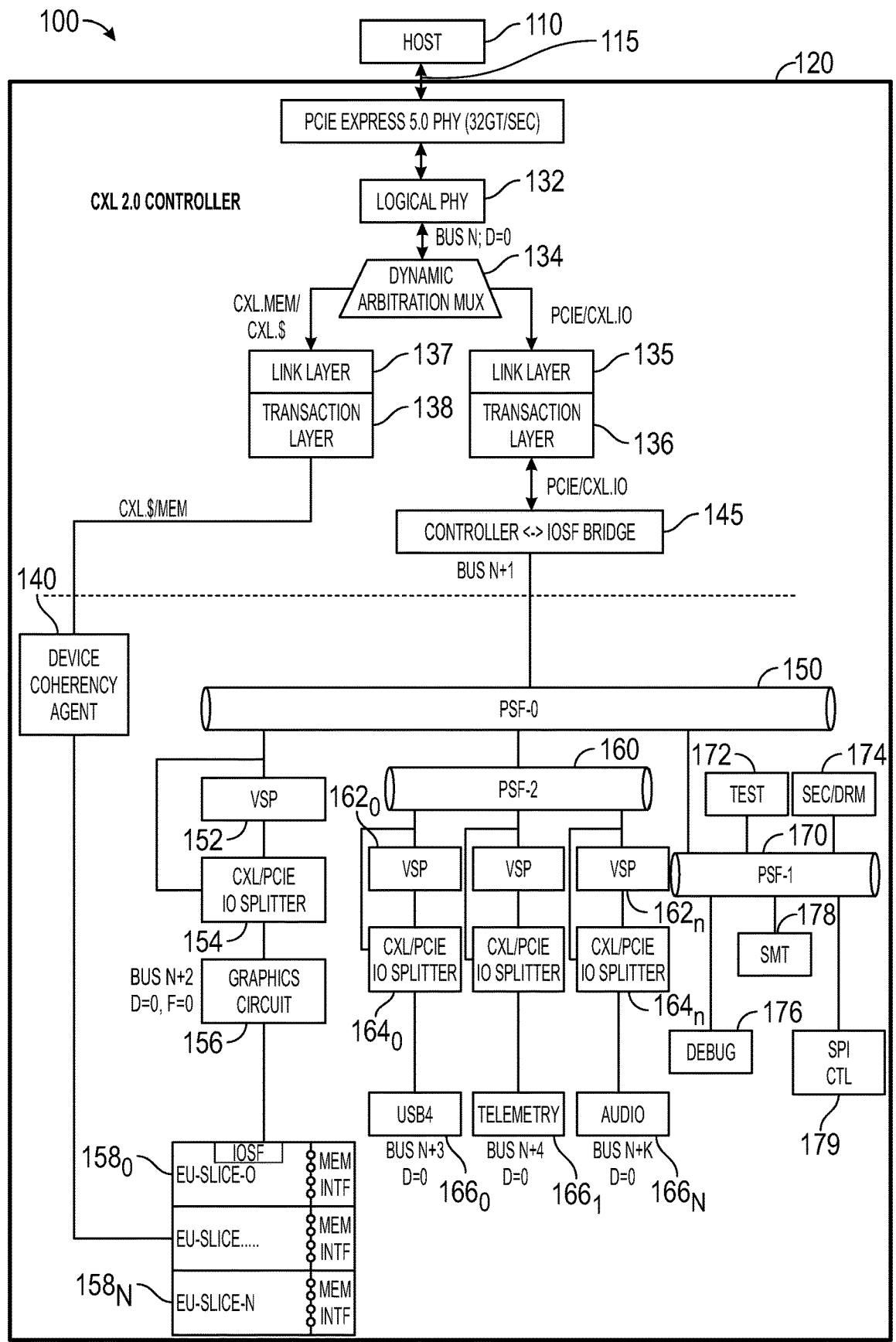
FIG. 1B is another view of a system in accordance with an embodiment.

Referring now to FIG. 1B, shown is another view of a system in accordance with an embodiment. More specifically as shown in FIG. 1B, system 100 may be implemented with the same hardware arrangement discussed above in FIG. 1A. In this view, however, note that the system is configured for a first mode of operation having integrated switch functionality, e.g., according to a CXL2.0 or PCIe configuration.

Thus as shown, link controller 130 may be implemented as an integrated switch according to this enumeration. In turn, VSPs (e.g., VSP 152 and $162_0$-$162_n$) are enabled in this arrangement, and endpoints behind these VSPs may be enumerated as PCIe endpoints, enumerated with a given bus and device (and potentially function) numbers as shown in FIG. 1B. Note that each endpoint is enumerated with a different bus number (and may all be enumerated as device 0 of the given bus, in this example).

Further, to dynamically configure fabric 150, a first shadowing base address register (BAR) configuration may be set, where the shadowed IDs and space for these devices may reference the VSPs, rather than the endpoints themselves in this first mode. Note that other devices, such as those coupled to fabric 170 may be hidden from host 110. Thus, as shown in FIG. 1B, a first configuration of device 120 occurs in which the device is implemented with integrated switch functionality and a first configuration for its fabrics, and a first hardware configuration of various IP circuits as being PCIe endpoints (having a first configuration space and a first set of exposed registers).

Figure 1C:
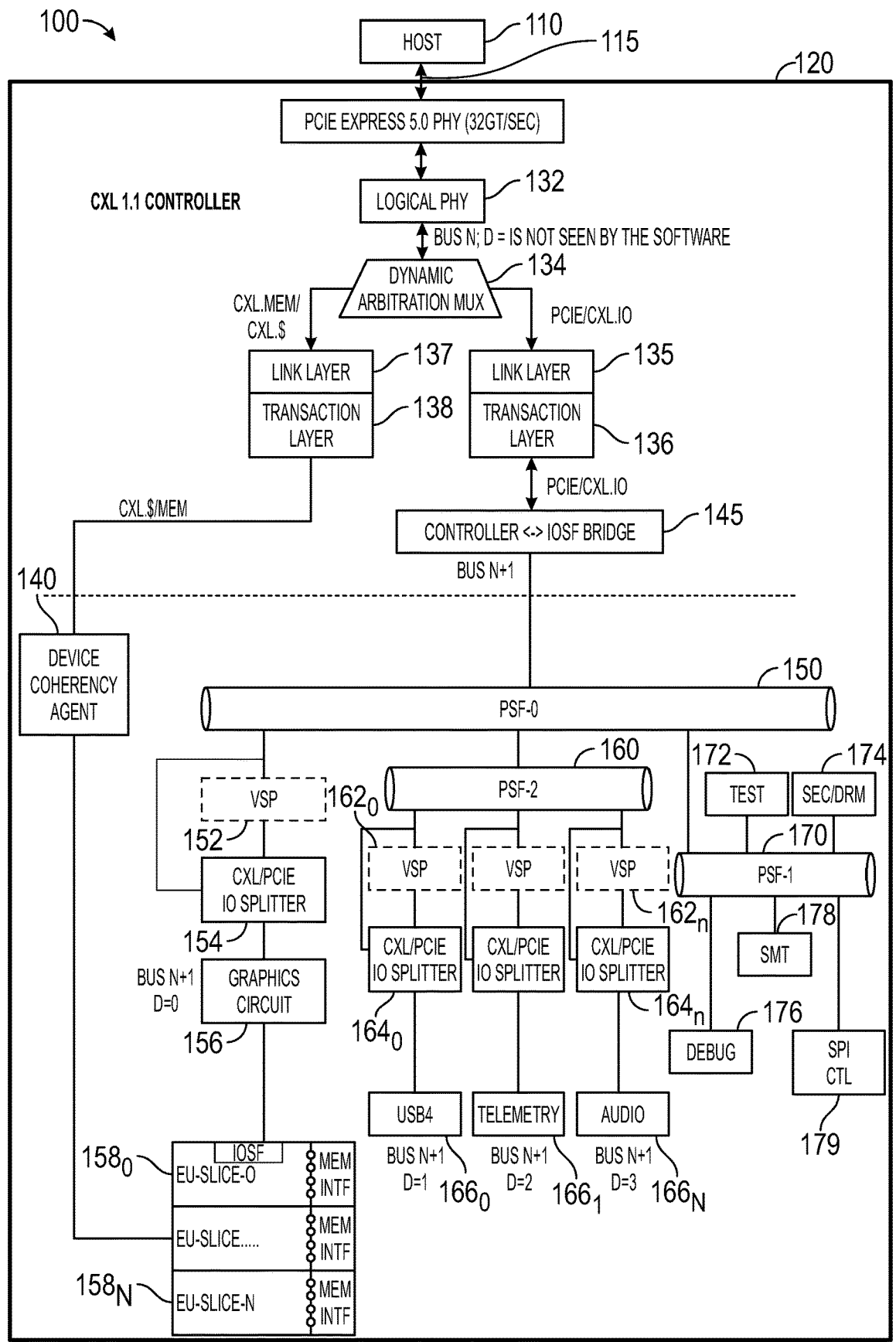
FIG. 1C is another view of a system in accordance with an embodiment.

Referring now to FIG. 10, shown is another view of a system in accordance with an embodiment. More specifically as shown in FIG. 1C, system 100 again may be implemented with the same hardware arrangement discussed above in FIG. 1A. In this view, however, note that the system is configured for a second mode of operation as a CXL 1.1 link controller according to this enumeration. In turn, VSPs (e.g., VSP 152 and $162_0$-$162_n$) are disabled in this arrangement, and endpoints behind these VSPs may be enumerated as root complex endpoints, each enumerated as a different device (but with the same bus number) as shown in FIG. 10.

Further, to dynamically configure fabric 150, a second shadowing BAR configuration may be set, where the shadowed IDs and space for these devices may reference the endpoints themselves in this second mode since the VSPs are disabled and bypassed here. Note that other devices, such as those coupled to fabric 170 may be hidden from host 110.

Thus, as shown in FIG. 10, a second configuration of device 120 occurs in which the device is implemented as a CXL1.1 link controller and a second configuration for its fabrics, and a second hardware configuration of various IP circuits as being root complex integrated endpoints (having a second configuration space and a second set of exposed registers). Of course while FIGS. 1B and 10 show specific enumerations of various components, different enumerations may occur in other implementations.

Figure 2:
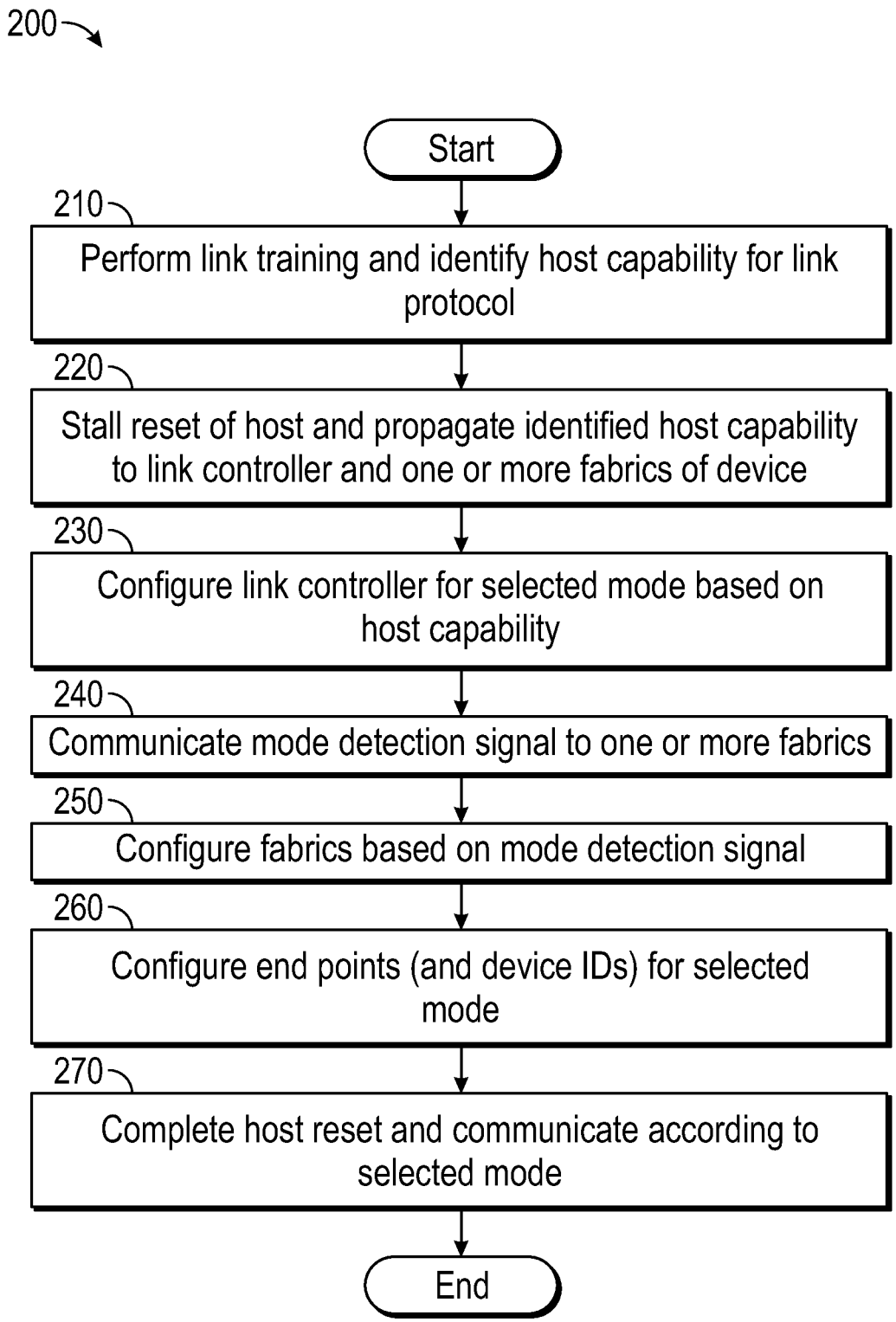
FIG. 2 is a flow diagram of a method in accordance with an embodiment.

Referring now to FIG. 2, shown is a flow diagram of a method in accordance with an embodiment. More specifically, method 200 shown in FIG. 2 is a method for dynamically configuring a device for one of multiple modes when it is placed into a given platform implementation. As such, method 200 may be performed at least in part by the device along with host involvement during any given power on or other reset of the system.

As shown, method 200 begins by performing link training and identifying a host capability for a given link protocol (block 210). To this end, link training circuitry, both in the host and device, may communicate to identify protocol capabilities according to a negotiation, e.g., with regard to supported protocol, link speeds and so forth. As a result of this link training in which a given protocol is identified, control passes to block 220 where a reset of the host, e.g., a SoC, may be stalled. In an embodiment, during the link training firmware may read the trained state of the link controller and cause the stall of the SoC reset, and propagation of this mode or capability to circuitry in the device. For example the identified host capability can be propagated to a link controller and one or more fabrics of the device. In this way, the link controller can be dynamically configured as an integrated switch, e.g., for a first mode and as a CXL1.1 link controller for a second mode, based on the identified host capability, which in one embodiment may take the form of a mode detection signal.

Still with reference to FIG. 2, next at block 240 this mode detection signal may be communicated to one or more fabrics. In turn, at block 250 fabrics (e.g., routers) may be configured based on which components in the network are to be visible to the host, to ensure appropriate traffic routing. As a result, various routing components, including shadowed BARs may be changed. For example, all virtual switch ports may be controlled to be bypassed in a second mode. Accordingly, shadowed BARs in the fabric may be updated to direct communications directly to endpoints, rather than these virtual switch ports. Instead in a first mode in which endpoints are to be configured as PCIe devices, the shadowed BARs can be configured to direct communications to the virtual switch ports, rather than directly to the endpoints.

Looking at Table 1 below, different components may be shadowed in BARs of a fabric depending on mode of operation, according to one example. Note that in a first mode, VSPs may be included in shadowed BARs, and their coupled endpoint devices are not. Instead, in a second mode, these VSPs are not shadowed, and the endpoint devices themselves are. As such, the VSPs are visible in the first mode but not the second mode.

TABLE 1

Components that are shadowed in PSF0 router based on CXL.1.1/2.0/PCIe mode the SoC is operating in

| SoC Component that is visible to the host | CXL 2.0 (Upstream Port mode) | PCIe Gen5 (Upstream port mode) | CXL 1.1 (Controller Mode) |
| --- | --- | --- | --- |
| SGUNIT (Graphic Device) | No | No | Yes |
| AUDIO | No | No | Yes |
| TELEMETRY | No | No | Yes |
| USB4 | No | No | Yes |
| VSP_SGUNIT | Yes | Yes | NA |
| VSP_AUDIO | Yes | Yes | NA |
| VSP_TELEMETRY | Yes | Yes | NA |
| VSP_USB4 | Yes | Yes | NA |

Still referring to FIG. 2, at block 260 the endpoints themselves may be configured (along with their device IDs) for the selected mode, e.g., based on the mode detection signal. Thus depending upon the selected mode, the endpoints may be configured as PCIe endpoints (e.g., for the first mode) or as root complex integrated endpoints (e.g., for the second mode). In this way, a configuration space of these endpoints may be modified, with certain registers being exposed and others hidden to make the endpoint behave as one or the other of these endpoint types. Still further, each endpoint may have a different device ID configuration for the different modes.

Looking at Table 2 below, each configuration space item can be dynamically configured to make an IP circuit (endpoint) appear as a PCIe endpoint or as a root complex integrated endpoint.

TABLE 2

Expected behavior of each component in various functional modes
PCIEP: Pci Express End point
RCIEP: Root Complex Integrated End Point

| SoC Component that is visible to the host | CXL 2.0 (Upstream Port mode) | CXL 1.1 (Controller Mode) | PCIe Gen5 (Upstream port mode) |
|---|---|---|---|
| SGUNIT (Graphic Device) | CXL device (Exposes DVSEC) | CXL device (Exposes DVSEC) | PCIe Upstream Port (PCIEP) |
| AUDIO | PCIEP | RCiEP | PCIEP |
| TELEMETRY | PCIEP | RCiEP | PCIEP |
| USB4 | PCIEP | RCiEP | PCIEP |
| VSP_SGUNIT | PCI-PCI Bridge | Invisible* | PCI-PCI Bridge |
| VSP_AUDIO | PCI-PCI Bridge | Invisible* | PCI-PCI Bridge |
| VSP_TELEMETRY | PCI-PCI Bridge | Invisible* | PCI-PCI Bridge |
| VSP_USB4 | PCI-PCI Bridge | Invisible* | PCI-PCI Bridge |

*Invisible: Component is hidden from the host

Finally with reference to FIG. 2, at block 270, host reset may complete and thereafter communication may proceed according to the selected mode, as the device is correctly configured for the appropriate mode. Thus according to method 200, a dynamically configured fabric is realized that changes behavior once the link is trained to an L0 link state. In one or more examples, firmware may configure the fabric to switch to appropriate mode and initiate a reset sequence after this configuration before the host enumeration occurs to ensure that the modified configuration takes effect. Understand while shown at this high level in the embodiment of FIG. 2, many variations and alternatives are possible.

As described above components may have different device IDs for the different modes to ensure no conflicts. In one example, device and function numbers may be dynamically configured. Referring now to Table 3, shown is an example listing of dynamic device IDs for various IP circuits. In Table 3, there may be 64 virtual functions in various modes for a graphics function. Further as shown, VSPs are visible and assigned numbers if they are in PCIe/CXL2.0 mode, and not in CXL1.1 mode. Also various endpoints and their device IDs may depend upon whether they are seen directly by the root complex (CXL1.1 mode) or only through the downstream VSP's in PCIe/CXL2.0 mode. Note at least some of these device IDs may be stored in shadowing BARs of one or more fabrics for fabric routing and may also be used for host enumeration. As shown in Table 3, there are minimal or no differences in the IDs between CXL1.1 and CXL2.0/PCIE modes. For example, virtual function IDs are the same, while devices coupled behind VSPs may have minimal device ID differences in the different modes.

TABLE 3

| | PCIE ID | | 8' bit | CXL 1.1 RCiEP | |
|---|---|---|---|---|---|
| | | | | Device number in CXL 1.1 | Function # in CXL 1.1 mode for |
| IP Name | Device | Function | {Dev, func} | mode | RS0 |
| SGUNIT PF | 00000 | 000 | 00000000 | 0 | 0 |
| SGUNIT VF0 | 00000 | 001 | 00000001 | 0 | 1 |
| ... | ... | ... | ... | ... | ... |
| ... | ... | ... | ... | ... | ... |
| SGUNIT VF63 | 00111 | 111 | 00111111 | 7 | 63 |
| VSP_<IP> | NA | NA | NA | NA | NA |
| AUDIO | 10000 | 000 | 10000000 | 16 | 128 |
| OOB_MSM | 10001 | 000 | 10001000 | 17 | 136 |
| | 10001 | 001 | 10001001 | 17 | 137 |
| | 10001 | 010 | 10001010 | 17 | 138 |
| XHCI-USB2 | 10010 | 000 | 10010000 | 18 | 144 |
| XHCI-USB3 | 10011 | 000 | 10011000 | 19 | 152 |
| TBT (CIO)DMA | 10100 | 000 | 10100000 | 20 | 160 |
| I2C/I3C-Host | 10101 | 000 | 10101000 | 21 | 168 |
| CSC | 10110 | 000 | 10110000 | 22 | 176 |
| SGUNIT PF | 00000 | 000 | 00000000 | 0 | 0 |
| SGUNIT VF0 | 00000 | 001 | 00000001 | 0 | 1 |
| ... | ... | ... | ... | ... | ... |
| ... | ... | ... | ... | ... | ... |
| SGUNIT VF63 | 00111 | 111 | 00111111 | 7 | 63 |
| <IP> | 00000 | 000 | 00000000 | 0 | 0 |
| VSP_AUDIO | 01000 | 000 | 01000000 | 8 | 64 |
| VSP_OOB_MSM | 01001 | 000 | 01001000 | 9 | 72 |
| VSP_XHCI-USB2 | 01010 | 000 | 01010000 | 10 | 80 |
| VSP_XHCI-USB3 | 01011 | 000 | 01011000 | 11 | 88 |

TABLE 3-continued

| | PCIE ID | | 8' bit | CXL 1.1 RCiEP | |
|---|---|---|---|---|---|
| | | | | Device number in CXL 1.1 | Function # in CXL 1.1 mode for |
| IP Name | Device | Function | {Dev, func} | mode | RS0 |
| VSP_TBT (CIO)DMA | 01100 | 000 | 01100000 | 12 | 96 |
| VSP_I2C/I3C-Host | 01101 | 000 | 01101000 | 13 | 104 |
| VSP_CSC | 01110 | 000 | 01110000 | 14 | 112 |

Figure 3:
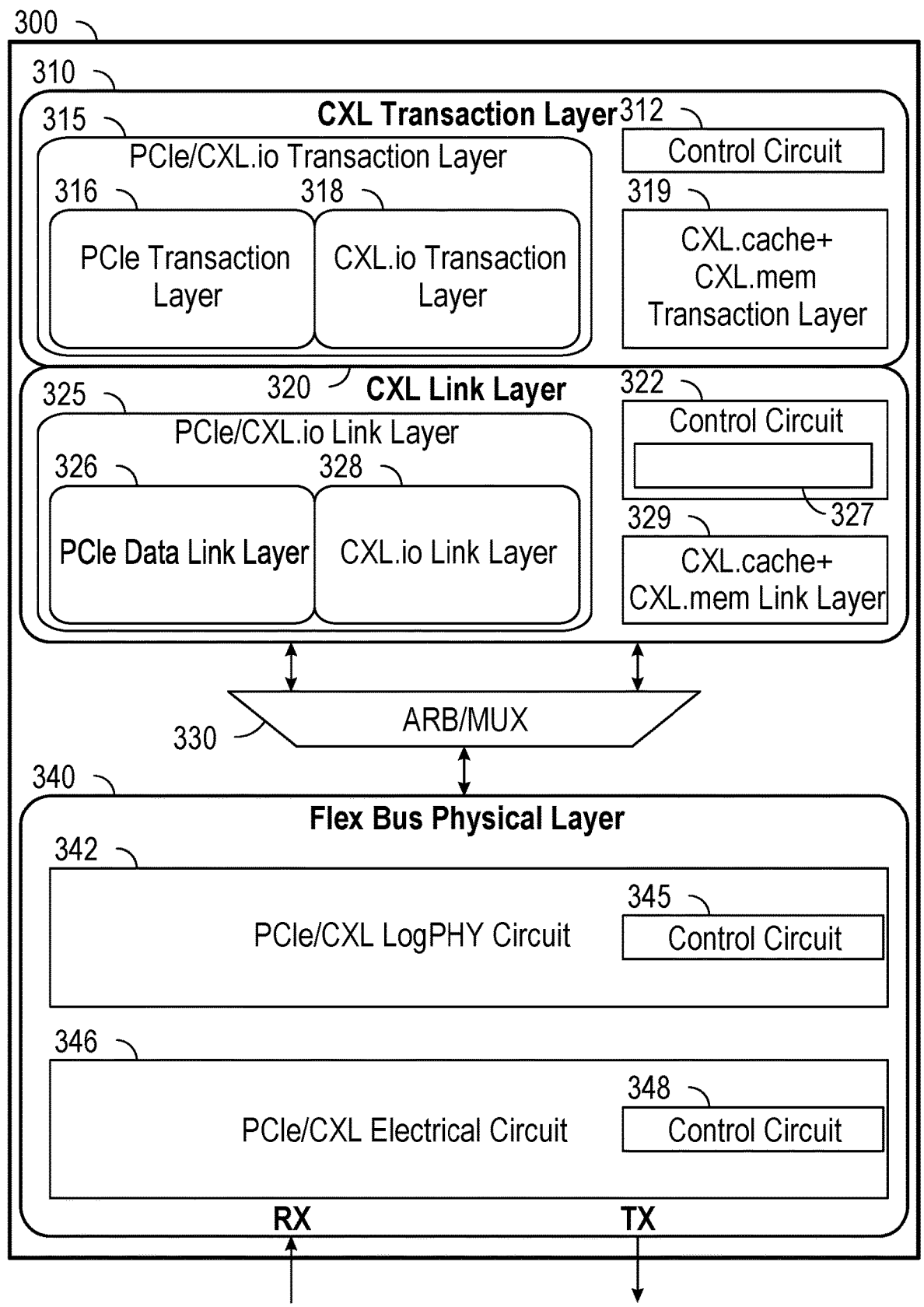
FIG. 3 is a block diagram of an interface circuit in accordance with an embodiment.

Referring now to FIG. 3, shown is a block diagram of an interface circuit in accordance with an embodiment. More specifically as shown in FIG. 3, interface circuit 300 is for interfacing a given device such as an accelerator to a link. In the embodiment shown in FIG. 3, interface circuit 300 is a CXL interface circuit. As shown, CXL interface circuit 300 includes a transaction layer 310, a link layer 320, and a physical layer 340. With reference to CXL transaction layer 310, various components are included to enable transaction layer processing for PCIe/CXL.io communications and CXL.cache and CXL.memory transactions. More particularly, a PCIe/CXL.io transaction layer 1015 includes a control circuit 312, which may perform various transaction layer control operations. In addition, transaction layer 310 further includes a PCIe transaction layer 316 and additional circuitry 318 for handling enhancements to PCIe transaction layer 316 for handling CXL.io transactions. In turn, CXL.cache and CXL.memory transaction layer 319 may perform transaction layer processing for these protocols.

With reference to CXL link layer 320, various components are included to enable link layer processing for PCIe/CXL.io communications and CXL.cache and CXL.memory transactions. More particularly, a PCIe/CXL.io link layer 325 includes a PCIe data link layer 326 and additional circuitry 328 for handling enhancements to PCIe data link layer 326 for handling CXL.io transactions.

In turn, CXL.cache and CXL.memory link layer 329 may perform link layer processing for these protocols. To this end, a control circuit 322 may configure handling circuitry within link layer 329 based at least in part on communications with a logPHY circuit as described herein. In an embodiment, control circuit 322 may include or be coupled to one or more configuration registers 327. Such configuration registers may include one or more fields to control operation as described herein.

With further reference to FIG. 3, link layer 320 is coupled to an arbiter/multiplexer 330 that is to receive incoming data streams from link layer 320 and select a data stream (or portion thereof) for communication to a physical layer 340.

In an embodiment, physical layer 340 may be a physical layer to further process incoming data packets for communication on a physical link, which in an embodiment may be a flex bus. As illustrated, physical layer 340 includes a PCIe/CXL logPHY logical circuit 342 and a PCIe/CXL electrical circuit 346. As seen, these circuits include respective control circuits 345, 348 to control processing within physical layer 340. After all such processing is completed, outgoing transaction layer data packets may be communicated on the link. Similarly, incoming transaction layer data packets may be received within physical layer 340 and processed within the communication stack of interface circuit 300. Note that different configuring of one or more programmable fabrics coupled to interface circuit 300 (and more particularly transaction layer 310) may occur based on a negotiated mode of communication, as described herein. Understand while shown at this high level in the embodiment of FIG. 3, many variations and alternatives are possible.

Figure 4:
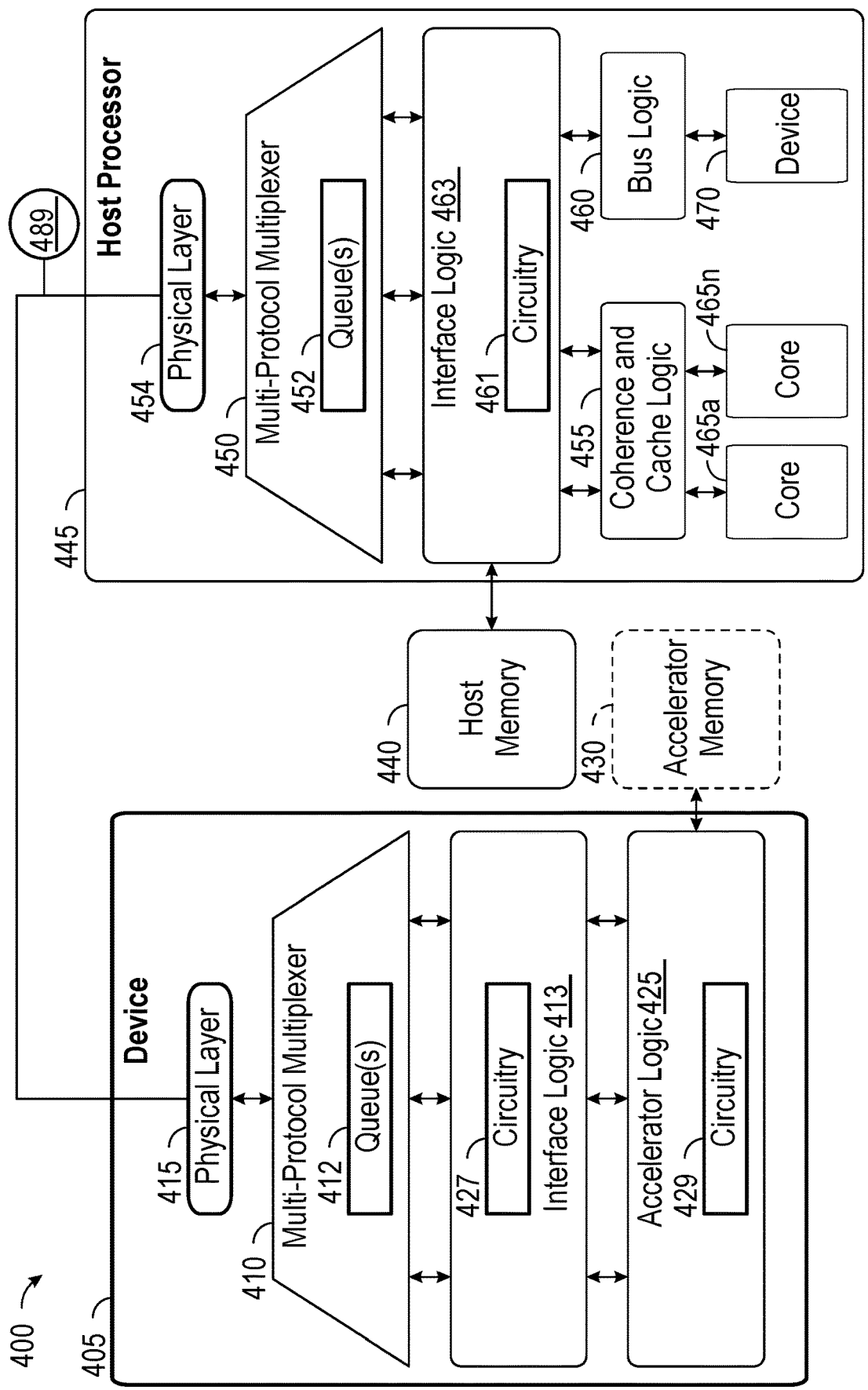
FIG. 4 is a block diagram of a system in accordance with an embodiment.

FIG. 4 is a block diagram of a system in accordance with an embodiment. As shown in FIG. 4 a device 405 may be an accelerator or processor device coupled to a host processor 445 via an interconnect 489, which may be single interconnect, bus, trace, and so forth. Device 405 and host processor 445 may communicate over link 489 to enable data and messages to pass therebetween. In some embodiments, link 489 may be operable to support multiple protocols and communication of data and messages via the multiple interconnect protocols, including a CXL protocol as described herein. For example, link 489 may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In embodiments, device 405 may include accelerator logic 425 including circuitry 429. In some instances, accelerator logic 425 and circuitry 429 may provide processing and memory capabilities. Examples of device 405 may include producer-consumer devices such as a graphics or other specialized accelerator, producer-consumer plus devices, software-assisted device memory devices, autonomous device memory devices, and giant cache devices. In some cases, accelerator logic 425 may couple to an optional accelerator memory 430. Accelerator logic 425 and circuitry 429 may provide the processing and memory capabilities based on the device. For example, accelerator logic 425 and circuitry 429 may communicate using, for example, a coherent interconnect protocol for various functions, such as coherent requests and memory flows with host processor 445 via interface logic 413 and circuitry 427.

Interface logic 413 and circuitry 427 may determine an interconnect protocol based on the messages and data for communication. Such logic and circuitry may configure one or more programmable fabrics within device 405 based on a negotiated mode of communication, as described herein. es as described herein. In some embodiments, interface logic 413 may be coupled to a multi-protocol multiplexer 410 having one or more protocol queues 412 to send and receive messages and data with host processor 445. Protocol queue 412 may be protocol specific such that each interconnect protocol may be associated with a particular protocol queue. Multiplexer 410 may also implement arbitration circuitry to arbitrate between communications of different protocols and provide selected communications to a physical layer 415.

In various embodiments, host processor 445 may be a main processor such as a CPU. Host processor 445 may be coupled to a host memory 440 and may include coherence logic (or coherence and cache logic) 455, which may include a cache hierarchy. Coherence logic 455 may communicate using various interconnects with interface logic 463 including circuitry 461 and one or more cores 465*a-n*. In some embodiments, coherence logic 455 may enable communication via one or more of a coherent interconnect protocol and a memory interconnect protocol.

In various embodiments, host processor 440 may include a device 470 to communicate with a bus logic 460 over an interconnect. In some embodiments, device 470 may be an I/O device, such as a PCIe I/O device. In other cases, one or more external devices such as PCIe devices may couple to bus logic 470.

In embodiments, host processor 445 may include interface logic 463 and circuitry 461 to enable multi-protocol communication between the components of host processor 445 and device 405. Interface logic 463 and circuitry 461 may process and enable communication of messages and data between host processor 445 and device 405 in accordance with one or more interconnect protocols, e.g., a non-coherent interconnect protocol, a coherent interconnect, protocol, and a memory interconnect protocol, dynamically. For example, interface logic 463 and circuitry 461 may determine a message type for each message and determine which interconnect protocol of a plurality of interconnect protocols to process each of the messages. Different interconnect protocols may be utilized to process the messages. In addition, circuitry 1161 may include selection circuitry to direct, e.g., CXL.cache and CXL.memory protocol traffic via a selected one of multiple logical ports as described herein.

In some embodiments, interface logic 463 may be coupled to a multi-protocol multiplexer 450 having one or more protocol queues 452 to send and receive messages and data with device 405. Protocol queue 452 may be protocol specific such that each interconnect protocol may be associated with a particular protocol queue. Multiplexer 450 may also implement arbitration circuitry to arbitrate between communications of different protocols and provide selected communications to a physical layer 454.

Figure 5:
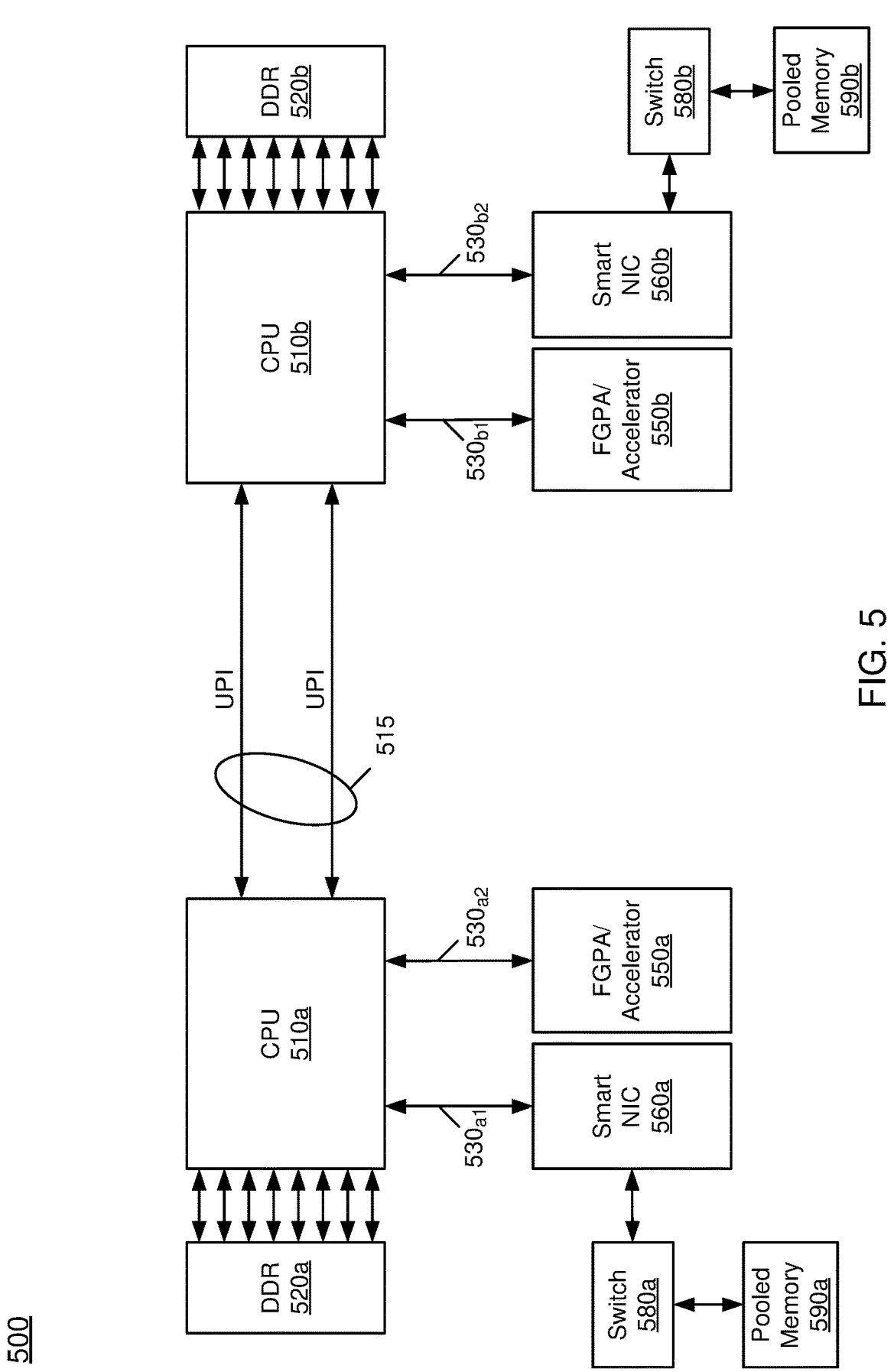
FIG. 5 is a block diagram of a system in accordance with another embodiment of the present invention.

Referring now to FIG. 5, shown is a block diagram of a system in accordance with another embodiment of the present invention. As shown in FIG. 5, a system 500 may be any type of computing device, and in one embodiment may be a server system such as an edge platform. In the embodiment of FIG. 5, system 500 includes multiple CPUs 510*a,b* that in turn couple to respective system memories 520*a,b* which in embodiments may be implemented as double data rate (DDR) memory. Note that CPUs 510 may couple together via an interconnect system 515 such as an Intel® Ultra Path Interconnect or other processor interconnect technology.

To enable coherent accelerator devices and/or smart adapter devices to couple to CPUs 510 by way of potentially multiple communication protocols, a plurality of interconnects 530*a*1-*b*2 may be present. In an embodiment, each interconnect 530 may be a given instance of a CXL link.

In the embodiment shown, respective CPUs 510 couple to corresponding field programmable gate arrays (FPGAs)/accelerator devices 550*a,b* (which may include graphics processing units (GPUs) and programmable fabrics as described herein), in one embodiment. In addition CPUs 510 also couple to smart network interface circuit (NIC) devices 560*a,b*. In turn, smart NIC devices 560*a,b* couple to switches 580*a,b* (e.g., CXL switches in accordance with an embodiment) that in turn couple to a pooled memory 590*a,b* such as a persistent memory. As shown information can be stored in a pooled memory 590. In turn, CPUs 510 or other entities may access and further process this information from pooled memory 590.

The following examples pertain to further embodiments.

In one example, a device includes: an interface circuit to couple the device to a host via a link, wherein in a first mode the interface circuit is to be configured as an integrated switch controller and in a second mode the interface circuit is to be configured as a link controller; and a fabric coupled to the interface circuit, the fabric to couple to a plurality of IP circuits, where the fabric is to be dynamically configured for one of the first mode or the second mode based on link training of the link.

In an example, after the fabric is dynamically configured for the one of the first or second modes, the device is to be reset prior to enumeration of the device by the host.

In an example, the device further comprises the plurality of IP circuits coupled to fabric, wherein at least some of the plurality of IP circuits are to be dynamically configured to operate as PCIe endpoints in the first mode and to operate as root complex integrated endpoints in the second mode.

In an example, in the first mode a first IP circuit has a first configuration space including a first set of exposed registers, and in the second mode the first IP circuit has a second configuration space including a second set of exposed registers.

In an example, the interface circuit comprises an integrated switch controller, wherein the interface circuit is configured to be a PCIe or a CXL 2.0 integrated switch controller in the first mode and to be a CXL 1.1 controller in the second mode.

In an example, the device further comprises: a plurality of virtual switch ports, each of the plurality of virtual switch ports coupled between the fabric and one of the plurality of IP circuits; and a plurality of bypass paths, each of the plurality of bypass paths coupled between the fabric and one of the plurality of IP circuits.

In an example, the plurality of virtual switch ports are to be disabled in the second mode, and communication in the second mode between the fabric and a first IP circuit is to be via a first bypass path.

In an example, the device further comprises a first splitter coupled to the first IP circuit, where the first splitter is to selectively direct traffic to the fabric via the first bypass path in the second mode or via a first virtual switch port in the first mode.

In an example, the interface circuit is to send a mode detect signal to at least some of the plurality of IP circuits, where at least some of the plurality of IP circuits comprise controller circuitry to automatically and dynamically configure the IP circuit for one of the first mode or the second mode based on the mode detect signal.

In an example, the device comprises an accelerator having at least one accelerator circuit.

In an example, the device comprises an add-in card.

In another example, a method comprises: training, via a link training circuit, a link coupled between a host processor of a computing system and a device coupled to the host processor via the link; identifying a protocol capability of the host processor based at least in part on the training; and in response to identifying the protocol capability of the host processor as a first type, dynamically configuring at least one fabric of the device for a first mode, and in response to identifying the protocol capability of the host processor as a second type, dynamically configuring the fabric for a second mode.

In an example, the method further comprises: in response to identifying the protocol capability of the host processor as the first type, dynamically configuring at least one link controller of the device for the first mode to provide an integrated switch functionality; and in response to identifying the protocol capability of the host processor as the second type, dynamically configuring the link controller for the second mode without the integrated switch functionality.

In an example, the method further comprises: dynamically configuring a first endpoint of the device to be a PCIe endpoint having a first device ID in the first mode; and dynamically configuring the first endpoint to be a root complex endpoint having a second device ID in the second mode.

In an example, the method further comprises: providing a first configuration space having first exposed registers for the first endpoint in the first mode; and providing a second configuration space having second exposed registers for the first endpoint in the second mode.

In an example, dynamically configuring the at least one fabric comprises: in the first mode, configuring one or more shadow base address registers of the at least one fabric to enable routing between the at least one fabric and one or more virtual switch ports, the one or more virtual switch ports coupled to one or more endpoints; and in the second mode, configuring the one or more shadow base address registers to enable routing between the at least one fabric and the one or more endpoints.

In an example, the method further comprises stalling a reset of the host processor after training the link and before dynamically configuring the fabric, and continuing reset of the host processor after dynamically configuring the fabric.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises: a host processor having a plurality of cores and a first interface circuit to interface with a serial link; and a device coupled to the host processor via the serial link. The device may include: a second interface circuit to communicate with the host processor via the serial link; a fabric coupled to the second interface circuit, the fabric including a plurality of shadow base address registers; a plurality of virtual switch ports coupled to the fabric; a plurality of hardware circuits, each of the plurality of hardware circuits coupled to one of the plurality of virtual switch ports; and a plurality of bypass paths, each of the plurality of bypass paths to bypass one of the plurality of virtual switch ports, where the fabric is to be dynamically configured for one of a first mode or a second mode based on link training of the serial link.

In an example: in the first mode, the second interface circuit is to be configured as an integrated switch controller and the plurality of hardware circuits are to be configured as Peripheral Component Interconnect Express endpoints; and in the second mode, the second interface circuit is to be configured as a link controller and the plurality of hardware circuits are to be configured as root complex integrated endpoints.

In an example: in the first mode, the plurality of virtual switch ports are to be enabled and at least some of the shadow base address registers are to point to at least some of the plurality of virtual switch ports; and in the second mode, the plurality of virtual switch ports are to be disabled and at least some of the shadow base address registers are to point to at least some of the plurality of hardware circuits.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A device comprising:
    an interface circuit to couple the device to a host via a link, wherein in a first mode the interface circuit is to be configured as an integrated switch controller and in a second mode the interface circuit is to be configured as a link controller;
    a fabric coupled to the interface circuit, the fabric to couple to a plurality of intellectual property (IP) circuits, wherein the fabric is to be dynamically configured for one of the first mode or the second mode based on link training of the link; and a plurality of bypass paths, each of the plurality of bypass paths coupled between the fabric and one of the plurality of IP circuits.

2. The device of claim 1, wherein after the fabric is dynamically configured for the one of the first or second modes, the device is to be reset prior to enumeration of the device by the host.

3. The device of claim 1, further comprising the plurality of IP circuits coupled to fabric, wherein at least some of the plurality of IP circuits are to be dynamically configured to operate as Peripheral Component Interconnect Express (PCIe) endpoints in the first mode and to operate as root complex integrated endpoints in the second mode.

4. The device of claim 3, wherein in the first mode a first IP circuit has a first configuration space including a first set of exposed registers, and in the second mode the first IP circuit has a second configuration space including a second set of exposed registers.

5. The device of claim 3, wherein the interface circuit comprises an integrated switch controller, wherein the interface circuit is configured to be a PCIe or a Compute Express Limited (CXL) 2.0 integrated switch controller in the first mode and to be a CXL 1.1 controller in the second mode.

6. The device of claim 1, further comprising:
a plurality of virtual switch ports, each of the plurality of virtual switch ports coupled between the fabric and one of the plurality of IP circuits.

7. The device of claim 6, wherein the plurality of virtual switch ports are to be disabled in the second mode, and communication in the second mode between the fabric and a first IP circuit is to be via a first bypass path.

8. The device of claim 7, further comprising a first splitter coupled to the first IP circuit, wherein the first splitter is to selectively direct traffic to the fabric via the first bypass path in the second mode or via a first virtual switch port in the first mode.

9. The device of claim 1, wherein the interface circuit is to send a mode detect signal to at least some of the plurality of IP circuits, wherein at least some of the plurality of IP circuits comprise controller circuitry to automatically and dynamically configure the IP circuit for one of the first mode or the second mode based on the mode detect signal.

10. The device of claim 1, wherein the device comprises an accelerator having at least one accelerator circuit.

11. The device of claim 10, wherein the device comprises an add-in card.

12. A method comprising:
training, via a link training circuit, a link coupled between a host processor of a computing system and a device coupled to the host processor via the link;
identifying a protocol capability of the host processor based at least in part on the training;
in response to identifying the protocol capability of the host processor as a first type, dynamically configuring at least one fabric of the device for a first mode, and in response to identifying the protocol capability of the host processor as a second type, dynamically configuring the at least one fabric for a second mode; and
stalling a reset of the host processor after training the link and before dynamically configuring the at least one fabric.

13. The method of claim 12, further comprising:
in response to identifying the protocol capability of the host processor as the first type, dynamically configuring at least one link controller of the device for the first mode to provide an integrated switch functionality; and
in response to identifying the protocol capability of the host processor as the second type, dynamically configuring the link controller for the second mode without the integrated switch functionality.

14. The method of claim 13, further comprising:
dynamically configuring a first endpoint of the device to be a Peripheral Component Interconnect Express (PCIe) endpoint having a first device ID in the first mode; and
dynamically configuring the first endpoint to be a root complex endpoint having a second device ID in the second mode.

15. The method of claim 14, further comprising:
providing a first configuration space having first exposed registers for the first endpoint in the first mode; and
providing a second configuration space having second exposed registers for the first endpoint in the second mode.

16. The method of claim 12, wherein dynamically configuring the at least one fabric comprises:
in the first mode, configuring one or more shadow base address registers of the at least one fabric to enable routing between the at least one fabric and one or more virtual switch ports, the one or more virtual switch ports coupled to one or more endpoints; and
in the second mode, configuring the one or more shadow base address registers to enable routing between the at least one fabric and the one or more endpoints.

17. The method of claim 12, further comprising continuing the reset of the host processor after dynamically configuring the at least one fabric.

18. A system comprising:
a host processor having a plurality of cores and a first interface circuit to interface with a serial link; and
a device coupled to the host processor via the serial link, the device comprising:
a second interface circuit to communicate with the host processor via the serial link;
a fabric coupled to the second interface circuit, the fabric including a plurality of shadow base address registers;
a plurality of virtual switch ports coupled to the fabric;
a plurality of hardware circuits, each of the plurality of hardware circuits coupled to one of the plurality of virtual switch ports; and
a plurality of bypass paths, each of the plurality of bypass paths to bypass one of the plurality of virtual switch ports,
wherein the fabric is to be dynamically configured for one of a first mode or a second mode based on link training of the serial link.

19. The system of claim 18, wherein:
in the first mode, the second interface circuit is to be configured as an integrated switch controller and the plurality of hardware circuits are to be configured as Peripheral Component Interconnect Express endpoints; and
in the second mode, the second interface circuit is to be configured as a link controller and the plurality of hardware circuits are to be configured as root complex integrated endpoints.

20. The system of claim 19, wherein:
in the first mode, the plurality of virtual switch ports are to be enabled and at least some of the shadow base address registers are to point to at least some of the plurality of virtual switch ports; and in the second mode, the plurality of virtual switch ports are to be disabled and at least some of the shadow base address registers are to point to at least some of the plurality of hardware circuits.

* * * * *